Sept. 28, 1943. P. B. REEVES 2,330,449
BELT SPLICE
Filed March 30, 1942

INVENTOR.
PAUL B. REEVES,
BY: Hood & Hahn.
ATTORNEYS.

Patented Sept. 28, 1943

2,330,449

UNITED STATES PATENT OFFICE 2,330,449

BELT SPLICE

Paul B. Reeves, Columbus, Ind., assignor to Reeves Pulley Company, Columbus, Ind., a corporation of Indiana Application March 30, 1942, Serial No. 436,815

9 Claims. (Cl. 24—33)

The present invention relates to a belt splice, and specifically to an improvement in splices generally of the character of the splice disclosed in my prior Patent 1,671,048. The primary object of the present invention is to improve the said splice, in its construction and facility of assembly, and to reduce the cost of such splice, both as to the production of its parts and as to the labor involved in assembling it. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 1:
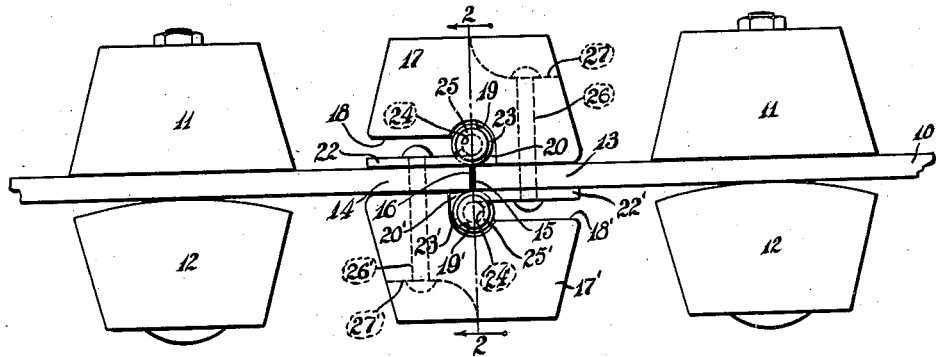
Fig. 1 is a side elevation of a fragment of a belt having its ends connected by the splice of the present invention.
Figure 2:
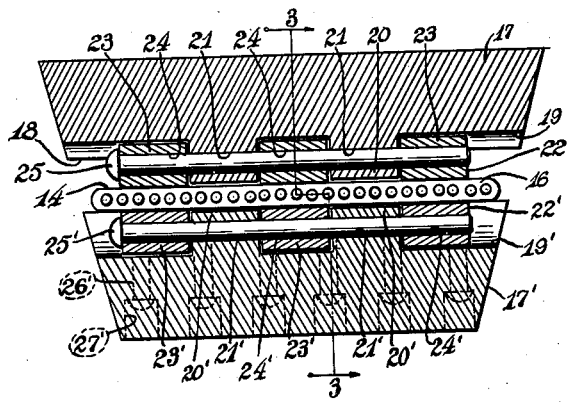
Fig. 2 is a transverse section taken substantially on the line 2—2 of Fig. 1 and looking in the direction of the arrows.

The belt to which the present invention relates comprises a band 10 to the outer surface of which is secured a series of transversely rigid blocks 11, and to the inner surface of which is secured a corresponding series of transversely rigid blocks 12. The band 10 transmits pulling force, while the blocks 11 and 12 give transverse rigidity to the belt and, in the embodiment of the belt illustrated, constitute the friction elements providing a driving connection between driving and driven V-type pulleys. The splice of the present invention is intended to connect together the two end portions 13 and 14 of the band 10.

Desirably, the extremities 15 and 16 of the respective belt end portions 13 and 14 should be brought as close as possible together by the splice, so that said two extremities, lying substantially perpendicular to the plane of the band body, shall lie substantially in a common plane perpendicular to the plane of such band body. A block 17, having its transverse ends shaped to correspond to the transverse ends of the blocks 11, is secured to the outer surface of the belt end portion 13. Said block is formed, in its surface adjacent the belt, with an undercut 18 which projects beyond the extremity 15 of the belt end 13 and is adapted to overlie the belt end 14. At its innermost extremity, the undercut 18 is formed to provide a part-cylindrical socket 19 which is interrupted, at a plurality of transversely spaced points, by lugs 20 forming aligned eyes 21. The common axis of said eyes 21 lies substantially in the plane of the belt extremity 15, and is spaced outwardly from the outer surface of the belt, in the manner illustrated.

Secured to the outer surface of the belt end 14 is a plate 22 formed to provide a plurality of transversely spaced lugs 23 providing aligned eyes 24. The common axis of said eyes 24 lies substantially in the plane of the belt extremity 16, and is spaced outwardly from the outer surface of the belt to an extent equal to the spacing of the axis of the eyes 21 from said belt surface.

Figure 3:
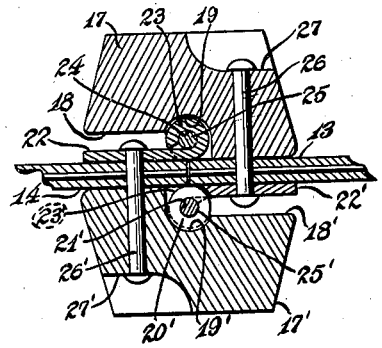
Fig. 3 is a longitudinal section taken substantially on the line 3—3 of Fig. 2 and looking in the direction of the arrows.
Figure 4:
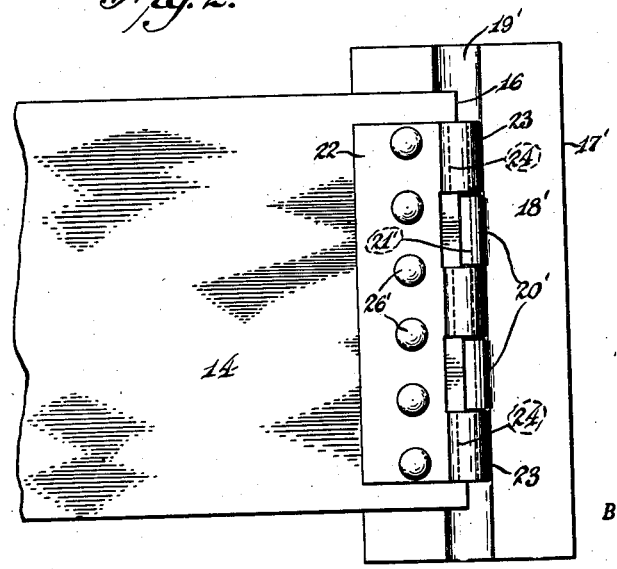
Fig. 4 is a plan view of one end only of the belt, with the splice parts associated therewith.

It follows from the above description that, when the belt extremities 15 and 16 are brought substantially into engagement with each other, the lugs 23 will be interdigitated with the lugs 20 to bring the eyes 24 into registry with the eyes 21. In this assembly step, the lugs 23 will pass through the undercut 18 and snap into the socket 19, said socket 19 being so shaped that the lugs 23 cannot be removed therefrom by relative movement parallel to the outer surface of the belt body. Instead, the block 17 must be moved upwardly and to the right with respect to the plate 22, as viewed in Fig. 3, to separate said elements. In order to lock the block and plate together, a pin 25 is passed through the registering eyes 21 and 24.

To the inner surface of the belt end 13 is secured a plate 22', similar in all respects to the plate 22, and formed to provide a transversely spaced series of lugs 23' formed to provide aligned eyes 24'. To the inner surface of the belt end 14 is secured a block 17', similar in all respects to the block 17. Said block 17' is formed with an undercut 18', adapted to overlie the plate 22', and formed at its inner edge to provide a part-cylindrical socket 19' interrupted by a transversely spaced series of lugs 20' formed to provide aligned eyes 21'. When the eyes 21' and 23' are aligned by interdigitation of the lugs 23' with the lugs 20', a pin 25' may be passed through such aligned eyes to lock the parts together. It will be noted that removal of the lugs 23' from their interdigitated relation with the lugs 20' can be effected only by movement of the plate 22' upwardly and to the right with respect to the block 17', as viewed in Fig. 3.

A series of transversely spaced rivets or bolts 26 passes through the plate 22' and through the block 17, each of said rivets being headed over against the inner surface of the plate 22' and against a parallel surface of a slot 27 preferably cut in the block 17. Thus the rivets 26, passing through the belt end 13 and engaging the plate 22' and the block 17, secure said plate and said block to said belt end. Similarly, a series of transversely spaced rivets 26' passes through the plate 22, the belt end 14, and a portion of the block 17', being headed over against the outer surface of said plate 22 and against a parallel surface formed in a preferably cutout slot 27' in the block 17' to secure said plate 22 and block 17' to the belt end 14.

It will be noted that the common axis of the eyes 21' and 24' lies substantially in the common plane of the extremities 15 and 16, and spaced inwardly from the inner surface of the belt body by an amount substantially equal to the spacing of the common axis of the eyes 21 and 24 outwardly from the outer surface of the belt body. The splice disclosed herein is made up, essentially, of six pieces; viz., one piece secured to each surface of each belt end, a pin for connecting together the pieces secured to the outer surface of the belt ends, and a pin for securing together the pieces secured to the inner surface of the belt ends.

I claim as my invention:

1. A driving belt comprising a flexible band and a series of transversely extending friction blocks secured thereto and connecting means for the ends of the belt comprising a block secured to the outer surface of one end of said belt and a plate secured to the outer surface of the other end of said belt, said block being formed with a recess in its inner surface adapted to overlie said other end of said belt, and said block and said plate being formed with interdigitated eyes, and a pin passing through said interdigitated eyes to secure said block and plate together.

2. A driving belt comprising a flexible band and a series of transversely extending friction blocks secured thereto and connecting means for the ends of the belt comprising a block secured to the outer surface of one end of said belt and a plate secured to the outer surface of the other end of said belt, said block being formed with a recess in its inner surface adapted to overlie said other end of said belt, and said block and said plate being formed with interdigitated eyes, said block eyes being located within said recess, and a pin passing through said interdigitated eyes to secure said block and plate together.

3. A driving belt comprising a flexible band and a series of transversely extending friction blocks secured thereto and connecting means for the ends of the belt comprising a block secured to the outer surface of one end of said belt and a plate secured to the outer surface of the other end of said belt, said block being formed with a recess in its inner surface adapted to overlie said other end of said belt, the innermost portion of said recess being part-cylindrical in section and being provided with a series of transversely spaced aligned eyes, and said plate being formed to provide at its outermost extremity an eye interdigitated with said block eyes, and a pin passing through said interdigitated eyes to secure said block and plate together 4. A driving belt comprising a flexible band and a series of transversely extending friction blocks secured thereto and connecting means for the ends of the belt comprising a block secured to the outer surface of one end of said belt and a plate secured to the outer surface of the other end of said belt, said block being formed with a recess in its inner surface adapted to overlie said other end of said belt, and said block and said plate being formed with interdigitated eyes, a pin passing through said interdigitated eyes to secure said block and plate together, a second plate secured to the inner surface of said one end of said belt and a second block secured to the inner surface of said other end of said belt, said second block being formed with a recess in its surface adjacent said belt adapted to overlie said one end of said belt, and said second block and second plate being formed with interdigitated eyes, and a second pin passing through the interdigitated eyes of said second block and second plate to secure the same together.

5. A driving belt comprising a flexible band and a series of transversely extending friction blocks secured thereto and connecting means for the ends of the belt comprising a block secured to the outer surface of one end of said belt and a plate secured to the outer surface of the other end of said belt, said block being formed with a recess in its inner surface adapted to overlie said other end of said belt, and said block and said plate being formed wtih interdigitated eyes, a pin passing through said interdigitated eyes to secure said block and plate together, a second plate secured to the inner surface of said one end of said belt and a second block secured to the inner surface of said other end of said belt, said second block being formed with a recess in its surface adjacent said belt adapted to overlie said one end of said belt, and said second block and second plate being formed with interdigitated eyes, and a second pin passing through the interdigitated eyes of said second block and second plate to secure the same together, said two pins being substantially parallel and lying in a common plane substantially perpendicular to said band.

6. A driving belt comprising a flexible band and a series of transversely extending friction blocks secured thereto and connecting means for the ends of the belt comprising a block secured to the outer surface of one end of said belt and a plate secured to the inner surface of said belt end, a second block secured to the inner surface of the other end of said belt and a second plate secured to the outer surface of said other belt end, each of said plates and each of said blocks being formed to provide an eye extending transversely of said band, the eyes on said one block and on said second plate and the eyes on said second block and on said one plate being registrable, and pins passing through said registrable eyes to secure said belt ends together.

7. A driving belt comprising a flexible band and a series of transversely extending friction blocks secured thereto and connecting means for the ends of the belt comprising a block secured to the outer surface of one end of said belt and a plate secured to the inner surface of said belt end, a second block secured to the inner surface of the other end of said belt and a second plate secured to the outer surface of said other belt end, each of said plates and each of said blocks being formed to provide an eye extending transversely of said band, the eyes on said one block and on said second plate and the eyes on said second block and on said one plate being registrable on axes lying substantially in a common plane midway between and parallel to the end surfaces of said belt, and pins passing through said registrable eyes to secure said belt ends together.

8. A driving belt comprising a flexible band and a series of transversely extending friction blocks secured thereto and connecting means for the ends of the belt comprising a block secured to the outer surface of one end of said belt and a plate secured to the inner surface of said belt end, a second block secured to the inner surface of the other end of said belt and a second plate secured to the outer surface of said other belt end, each of said blocks being formed in its surface adjacent said belt with a recess overlying at least a portion of that plate secured to the same surface of said belt, the innermost portion of said recess being formed to provide a socket part-cylindrical upon an axis lying substantially in the plane defined by the adjacent end surface of said belt, and each of said blocks further being provided with a series of transversely spaced aligned eyes within such socket, each of said plates being formed to provide at its outermost extremity an eye interdigitated with the eyes of one of said blocks, and pins passing through said interdigitated eyes to secure said belt ends together.

9. A driving belt comprising a flexible band and a series of transversely extending friction blocks secured thereto and connecting means for the ends of the belt comprising a block and a plate at one end of said belt, means passing through said band and engaging said block and said plate to secure the same to opposite surfaces of said belt end, said block projecting beyond said belt end a distance substantially equal to the dimension of said plate in the direction of belt length, said plate being formed, at its outermost extremity, to provide an eye arranged transversely of said belt upon an axis located substantially in the plane of the extremity of said belt end but spaced outwardly from that surface of the belt to which said plate is secured, said block being undercut in its surface adjacent said belt from its outer edge to a point spaced inwardly from said belt extremity, and being formed, at the innermost edge of such undercut, with a part-cylindrical socket having its axis substantially parallel with said plate eye axis and spaced outwardly from that surface of said belt to which said block is secured by a distance substantially equal to the spacing of said plate eye axis from said first-named belt surface, a second block and a second plate at the other end of said belt, means passing through said band and engaging said second block and said second plate to secure the same to opposite surfaces of said other belt end, the construction of said second block and said second plate being respectively the same as the construction of said first block and said first plate, and said second block being secured to that surface of the belt to the which said first plate is secured while said second plate is secured to that surface of said belt to which said first block is secured, an eye on said first plate registering with an eye on said second block, a pin passing through said registering eyes, an eye on said second plate registering with an eye on said first block, and a pin passing through said last-mentioned registering eyes.

PAUL B. REEVES.